Figure 1:
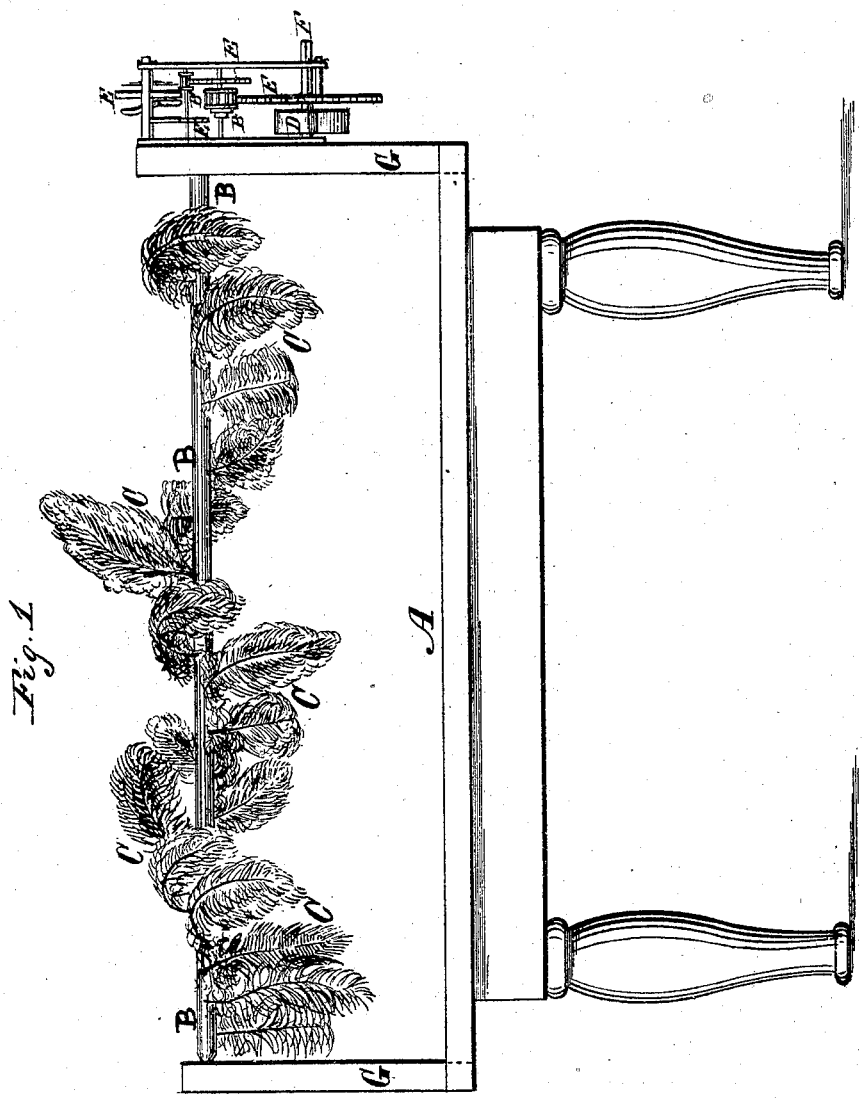

O. VANORMAN.
Automatic Fans.

No. 143,206. Patented September 23, 1873.

Witnesses

Inventor.
Oliver Vanorman

UNITED STATES PATENT OFFICE.

OLIVER VANORMAN, OF FOND DU LAC, WISCONSIN, ASSIGNOR OF ONE-HALF HIS RIGHT TO HENRY HAMILTON, OF SAME PLACE.

IMPROVEMENT IN AUTOMATIC FANS.

Specification forming part of Letters Patent No. 143,206, dated September 23, 1873; application filed April 7, 1873.

*To all whom it may concern:*

Be it known that I, OLIVER VANORMAN, of Fond du Lac, in the county of Fond du Lac and State of Wisconsin, have invented certain new and useful Improvements in Fly-Brushes, which are simple in construction, efficient in operation, and durable in use, having for its object to furnish a brush or fan which shall give a continuous blast; and it consists in having a series of fans arranged spirally around a central shaft, and combined with suitable mechanism to give a continuous rotation to the shaft, thereby causing a steady and continuous blast, as hereinafter more fully described; and I do hereby declare that the following is a full, clear, and exact description thereof, which will enable others skilled in the art to which it appertains to make and use the same, reference being had to the accompanying drawing, with letters of reference marked thereon, forming a part of this specification, in which—

Figure 1 is a side elevation of a device embodying my invention.

A represents a stand or table of any suitable construction, used to support the device, having two upright standards, G G, suitably journaled, in which is a shaft, B, having fans C arranged thereon in a spiral form, as shown in Fig. 1. To one of the standards G is secured the operative mechanism, which is connected with, and communicates a rotary motion to, the shaft B. The mechanism consists of wheels E and pinions $B'$ $B''$, and operated by spring D, similar to an ordinary clockwork.

The advantage of my invention over others is that, in all brushes and fans having an automatic movement, the fans or brushes have been arranged at intervals, so that the blast was not continuous, but having one fan follow in the path of its predecessor, so that it would make a succession of blasts; while by my improved device each fan has a separate path or space in which it revolves, and each fan is followed so closely by the next in order that the blast is continuous.

Having thus fully described my invention, what I claim, and desire to secure by Letters Patent, is—

The frame or stand A and shaft B, having the fans C arranged upon said shaft in a spiral form, in combination with operative mechanism, substantially as and for the purpose specified.

OLIVER VANORMAN.

Witnesses:
 WM. H. BOWE,
 A. A. SHEPHERD.